US011913253B2

(12) United States Patent
Almomani et al.

(10) Patent No.: US 11,913,253 B2
(45) Date of Patent: Feb. 27, 2024

(54) ELECTRONIC LOCK SYSTEM HAVING PROXIMITY MOBILE DEVICE

(71) Applicant: ASSA ABLOY Americas Residential Inc., New Haven, CT (US)

(72) Inventors: Nedal Almomani, Mission Viejo, CA (US); Thuan Nguyen, Mission Viejo, CA (US); Elena Gorkovenko, Mission Viejo, CA (US); Wei Hsu, Lake Forest, CA (US); Yos Singtoroj, Anaheim, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 17/866,161

(22) Filed: Jul. 15, 2022

(65) Prior Publication Data

US 2023/0040414 A1 Feb. 9, 2023

Related U.S. Application Data

(63) Continuation of application No. 16/362,023, filed on Mar. 22, 2019, now Pat. No. 11,391,064, which is a (Continued)

(51) Int. Cl.
*E05B 47/00* (2006.01)
*G07C 9/00* (2020.01)

(52) U.S. Cl.
CPC ...... *E05B 47/0001* (2013.01); *G07C 9/00309* (2013.01); *G07C 2209/08* (2013.01); (Continued)

(58) Field of Classification Search
CPC ............ E05B 47/0001; G07C 9/00309; G07C 2209/64; G07C 2209/65
See application file for complete search history.

(56) References Cited

U.S. PATENT DOCUMENTS

| | | | | |
|---|---|---|---|---|
| 4,783,638 A * | 11/1988 | Mamodaly | ........... | H03B 5/1876 331/117 FE |
| 5,729,057 A * | 3/1998 | Frenzel | .................. | B60Q 1/323 362/100 |

(Continued)

FOREIGN PATENT DOCUMENTS

| | | |
|---|---|---|
| EP | 0753822 A2 | 1/1997 |
| EP | 1835436 A2 | 9/2007 |

(Continued)

OTHER PUBLICATIONS

International Search Report for Application No. PCT/US13/66189, dated Feb. 6, 2014.

(Continued)

*Primary Examiner* — Vernal U Brown
(74) *Attorney, Agent, or Firm* — Merchant & Gould P.C.

(57) ABSTRACT

An electronic lock, such as a deadbolt, with a locking device movable between a locked position and an unlocked position. The lock includes a key fob including a RFID circuit indicative of a valid access code for the locking device. A circuit is provided that is configured to control movement of the locking device between the locked position and the unlocked position. The circuit includes a sensor, such as a contract sensor or a proximity sensor, which detects when a user is within range of a RFID device. When this happens, the sensor is configured to generate an electrical signal, which is used to activate the RFID device for a predetermined period of time. If the RFID device reads a valid access code, the device is unlocked.

20 Claims, 6 Drawing Sheets

Related U.S. Application Data continuation of application No. 14/102,560, filed on Dec. 11, 2013, now Pat. No. 10,240,365.

(60) Provisional application No. 61/736,345, filed on Dec. 12, 2012.

(52) U.S. Cl.
CPC ..... *G07C 2209/64* (2013.01); *G07C 2209/65* (2013.01); *Y10T 70/7062* (2015.04)

(56) References Cited

U.S. PATENT DOCUMENTS

| | | | | |
|---|---|---|---|---|
| 5,739,766 | A | 4/1998 | Chaloux | |
| 5,841,390 | A | 11/1998 | Tsiu | |
| 5,973,611 | A * | 10/1999 | Kulha | B60R 25/245 340/426.36 |
| 6,038,895 | A * | 3/2000 | Menke | E05B 81/84 70/278.1 |
| 6,209,367 | B1 | 4/2001 | Hyatt, Jr. | |
| 6,370,381 | B1 | 4/2002 | Minnick et al. | |
| 6,411,199 | B1 | 6/2002 | Geiszler et al. | |
| 6,577,226 | B1 | 6/2003 | Steiner | |
| 6,906,612 | B2 * | 6/2005 | Ghabra | G07C 9/00309 340/5.72 |
| 6,937,140 | B1 | 8/2005 | Outslay et al. | |
| 6,967,562 | B2 | 11/2005 | Menard et al. | |
| 9,109,378 | B2 | 8/2015 | Scalisi | |
| 9,674,124 | B1 | 6/2017 | Fisher et al. | |
| 10,240,365 | B2 | 3/2019 | Almomani et al. | |
| 10,783,731 | B2 | 9/2020 | Imanuel | |
| 11,391,064 | B2 | 7/2022 | Almomani et al. | |
| 2003/0137404 | A1 | 7/2003 | Bonneau et al. | |
| 2003/0151493 | A1 | 8/2003 | Straumann et al. | |
| 2003/0218533 | A1 * | 11/2003 | Flick | G07C 9/00182 340/5.22 |
| 2006/0255909 | A1 * | 11/2006 | Pavatich | B60R 25/24 340/5.72 |
| 2007/0290792 | A1 * | 12/2007 | Tsuchimochi | G07C 9/00309 340/5.72 |
| 2008/0011032 | A1 | 1/2008 | Groff | |
| 2008/0180211 | A1 | 7/2008 | Lien | |
| 2008/0258553 | A1 * | 10/2008 | Christenson | B60R 25/24 307/10.2 |
| 2009/0256366 | A1 | 10/2009 | Abe | |
| 2009/0256677 | A1 * | 10/2009 | Hein | B60R 25/00 340/5.72 |
| 2010/0283579 | A1 | 11/2010 | Kraus et al. | |
| 2010/0294008 | A1 | 11/2010 | Bogdanov et al. | |
| 2011/0063076 | A1 | 3/2011 | Kurtz et al. | |
| 2011/0234377 | A1 | 9/2011 | Landuyt et al. | |
| 2012/0073338 | A1 | 3/2012 | Mohla | |
| 2012/0157080 | A1 | 6/2012 | Metivier | |
| 2012/0196588 | A1 | 8/2012 | Shah | |
| 2012/0213362 | A1 | 8/2012 | Bliding et al. | |
| 2012/0280783 | A1 | 11/2012 | Gerhardt et al. | |
| 2013/0176107 | A1 | 7/2013 | Dumas et al. | |
| 2013/0210360 | A1 | 8/2013 | Ljung et al. | |
| 2013/0241694 | A1 | 9/2013 | Sharma et al. | |
| 2013/0293351 | A1 | 11/2013 | Kuenzi et al. | |
| 2013/0295986 | A1 | 11/2013 | Mueck | |
| 2013/0342314 | A1 | 12/2013 | Chen et al. | |
| 2014/0028438 | A1 | 1/2014 | Kuenzi et al. | |
| 2014/0145823 | A1 | 5/2014 | Aase | |
| 2014/0191848 | A1 | 7/2014 | Imes et al. | |
| 2014/0375421 | A1 | 12/2014 | Morrison et al. | |
| 2015/0027178 | A1 | 1/2015 | Scalisi et al. | |
| 2015/0040205 | A1 | 2/2015 | Van Till et al. | |
| 2015/0101369 | A1 | 4/2015 | Scalisi | |
| 2015/0170448 | A1 | 6/2015 | Robfogel et al. | |
| 2015/0199859 | A1 | 7/2015 | Ouyang et al. | |
| 2015/0269799 | A1 | 9/2015 | Martinez et al. | |

FOREIGN PATENT DOCUMENTS

| | | | |
|---|---|---|---|
| KR | 10-1470747 | B1 | 12/2014 |
| WO | 0065551 | A1 | 11/2000 |
| WO | 2009088901 | A1 | 7/2009 |
| WO | 2009158181 | A1 | 12/2009 |
| WO | 2010012463 | A2 | 2/2010 |
| WO | 2011109005 | A1 | 9/2011 |

OTHER PUBLICATIONS

International Search Report for Application No. PCT/US2013/66816, dated Feb. 19, 2014.
International Search Report for Application No. PCT/US2013/074291, dated Apr. 10, 2014.
USPTO: Office Action for U.S. Appl. No. 14/059,625, dated Aug. 27, 2015.

* cited by examiner

ELECTRONIC LOCK SYSTEM HAVING PROXIMITY MOBILE DEVICE

RELATED APPLICATIONS

The present application is a continuation of U.S. patent application Ser. No. 16/362,023, filed Mar. 22, 2019, now U.S. Pat. No. 11,391,064; which is a continuation of U.S. patent application Ser. No. 14/102,560, filed Dec. 11, 2013, now U.S. Pat. No. 10,240,365; which claims priority to U.S. Provisional Patent Application Ser. No. 61/736,345, filed on Dec. 12, 2012, entitled "Electronic Lock System Having Proximity Mobile Device." The subject matter disclosed in above applications is hereby expressly incorporated by reference into the present application in its entirety.

TECHNICAL FIELD

The present invention relates generally to electronic locks, and, more particularly, to an electronic lock system having a proximity mobile device.

BACKGROUND AND SUMMARY

A typical non-electronic door lock includes a key which must be inserted by a user into the lock and manipulated to unlock the lock to facilitate entry through the door. While electronic locks may eliminate, or provide an alternative to, the use of a key, typically the user must enter a code on a keypad having multiple buttons to facilitate lock operation. As such, in either case, substantial user interaction with the lock is required in order to unlock the lock. Accordingly, there is a need for a system that reduces the amount of user interaction required to operate a lock.

According to one aspect, the present invention provides a mobile device, such as a key fob, that has been pre-associated with an electronic lock, and wherein the user carrying the mobile device merely needs to touch the electronic lock, or the escutcheon or touch plate near the lock, in order to establish communications between the mobile device and the electronic lock to automatically operate the lock mechanism of the electronic lock.

According to another aspect, the invention provides an electronic lock, such as a deadbolt, with a locking device movable between a locked position and an unlocked position. The lock includes a key fob including a RFID circuit indicative of a valid access code for the locking device. A circuit is provided that is configured to control movement of the locking device between the locked position and the unlocked position. In one embodiment, the circuit includes a contact sensor having a contact region. The contact sensor is configured to generate an electrical signal responsive to detecting contact with the contact region. The circuit includes a RFID device configured to wirelessly receive an access code from a RFID circuit in range of the RFID device. The circuit includes a processing unit in electrical communication with the contact sensor and RFID device. The processing unit is configured to selectively activate the RFID device for a predetermined time period responsive to receiving the electrical signal from the contact sensor. The processing unit is configured to actuate movement of the locking device to the unlocked position responsive to the RFID device reading the valid access code.

In some embodiments, the contact sensor could be a capacitive sensor, an inductive sensor or a pressure sensor. In some cases, the lock includes an exterior escutcheon operatively associated with the locking device and the contact sensor is incorporated into the exterior escutcheon. Depending on the circumstances, the lock may include an interior escutcheon operatively associated with the locking device with a second contact sensor incorporated into the interior escutcheon.

In some embodiments, the sensor could be a non-contact sensor that is used to activate the RFID device. For example, the sensor could be a proximity sensor configured to detect the presence of a user within a range of the locking device without any physical contact of the proximity sensor. The proximity sensor is configured to generate an electrical signal responsive to detecting the presence of a user within the range of the locking device. In some cases, the proximity sensor could be an infrared sensor. Depending on the circumstances, the processing unit could be configured to determine whether the key fob is on an exterior side of a door by performing RF triangulation with the RFID device.

In a further aspect, the invention provides an electronic lock with a latch assembly including a bolt movable between an extended position and a retracted position. The lock includes a circuit configured to control movement of the bolt between the extended and retracted positions. In some cases, the circuit includes a sensor configured to generate an electrical signal responsive to detecting either: (1) the presence of a user within a range of the locking device without any physical contact of the sensor; or (2) physical contact with a contact region of the sensor. The circuit may include a RFID device configured to wirelessly read an access code from a mobile device. Non-transitory computer-readable medium could be provided that has a valid access code and a computer program code stored thereon. The circuit includes a processing unit in communication with the proximity sensor, RFID device, and the computer-readable memory. The processing unit is configured to carry out instructions in accordance with the computer program code, wherein the computer program code, when executed by the processing unit, causes the processing unit to perform operations comprising: (1) receiving an electrical signal from the sensor; (2) activating the RFID device for a predetermined time period responsive to receiving the electrical signal from the sensor; (3) receiving an access code from the RFID device; (3) determining whether the access code received from the RFID device is the valid access code; and (4) initiating the actuation of the bolt to the retracted position responsive to determining the access code is the valid access code.

Additional features and advantages of the invention will become apparent to those skilled in the art upon consideration of the following detailed description of the illustrated embodiment exemplifying the best mode of carrying out the invention as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE DRAWINGS

Figure 1A:
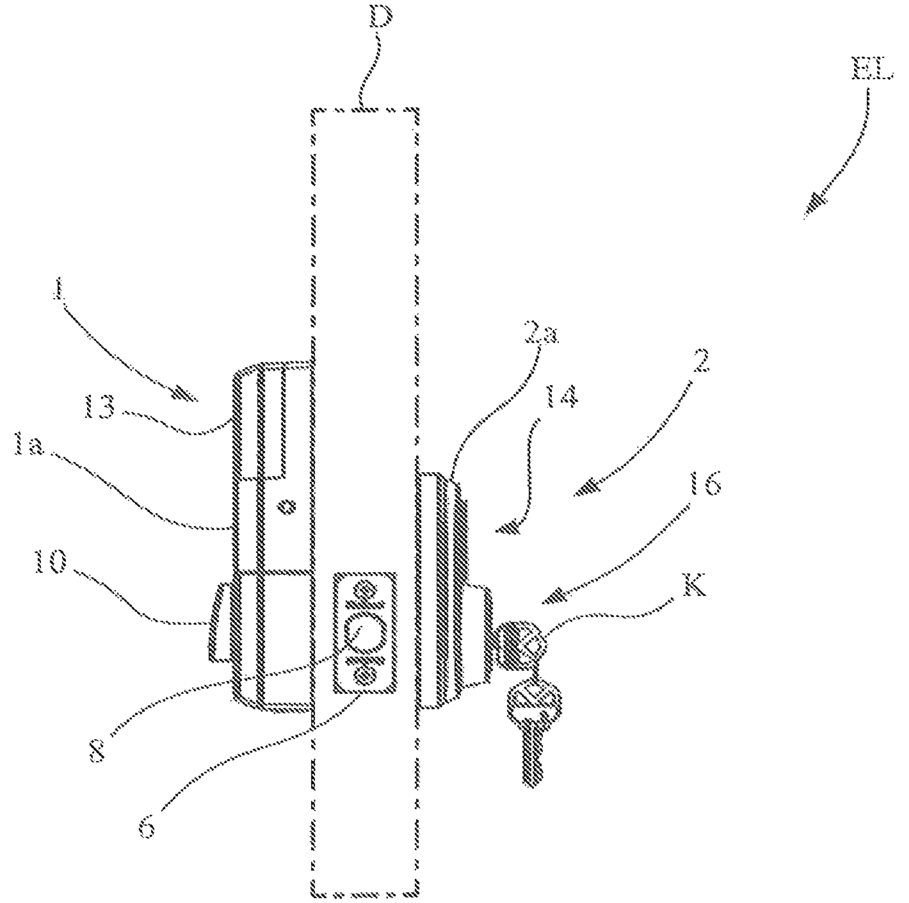
FIG. 1A is a side view of an electronic lock in accordance with an embodiment of the present invention, installed on a door and with the door shown in phantom lines.
Figure 1B:
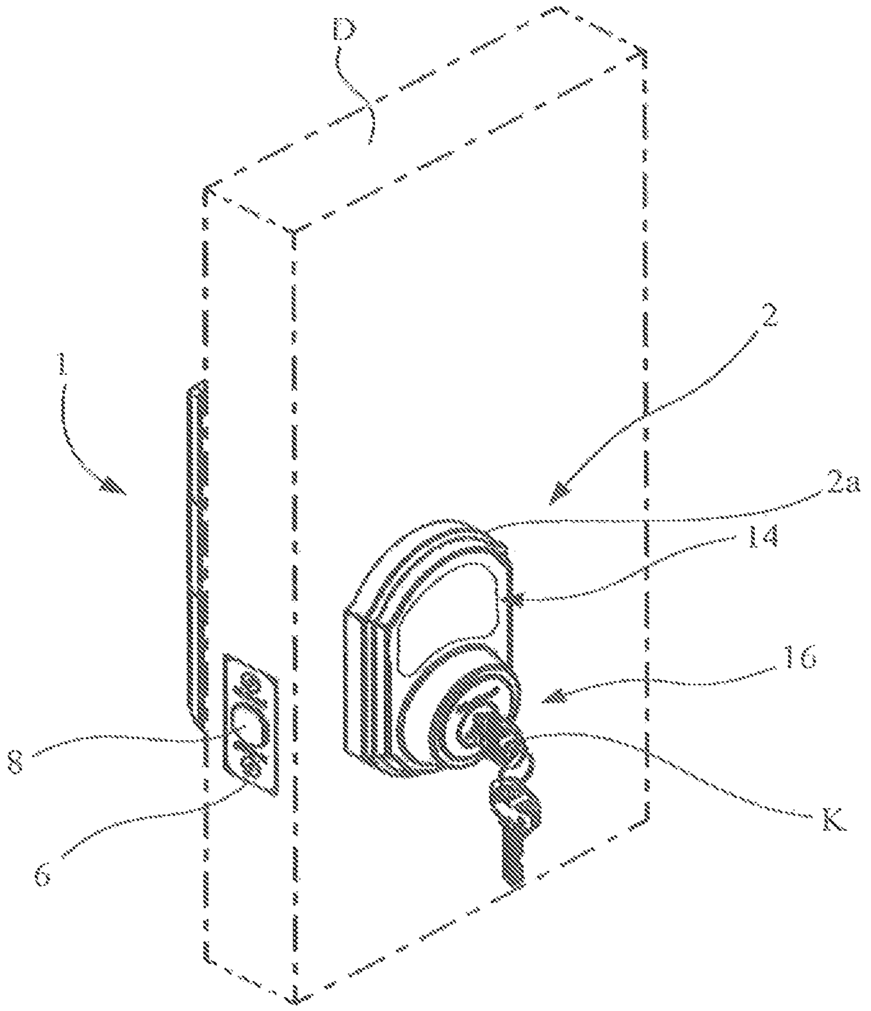
FIG. 1B is a perspective view of the electronic lock of FIG. 1A, as viewed from the exterior of the door.
Figure 1C:
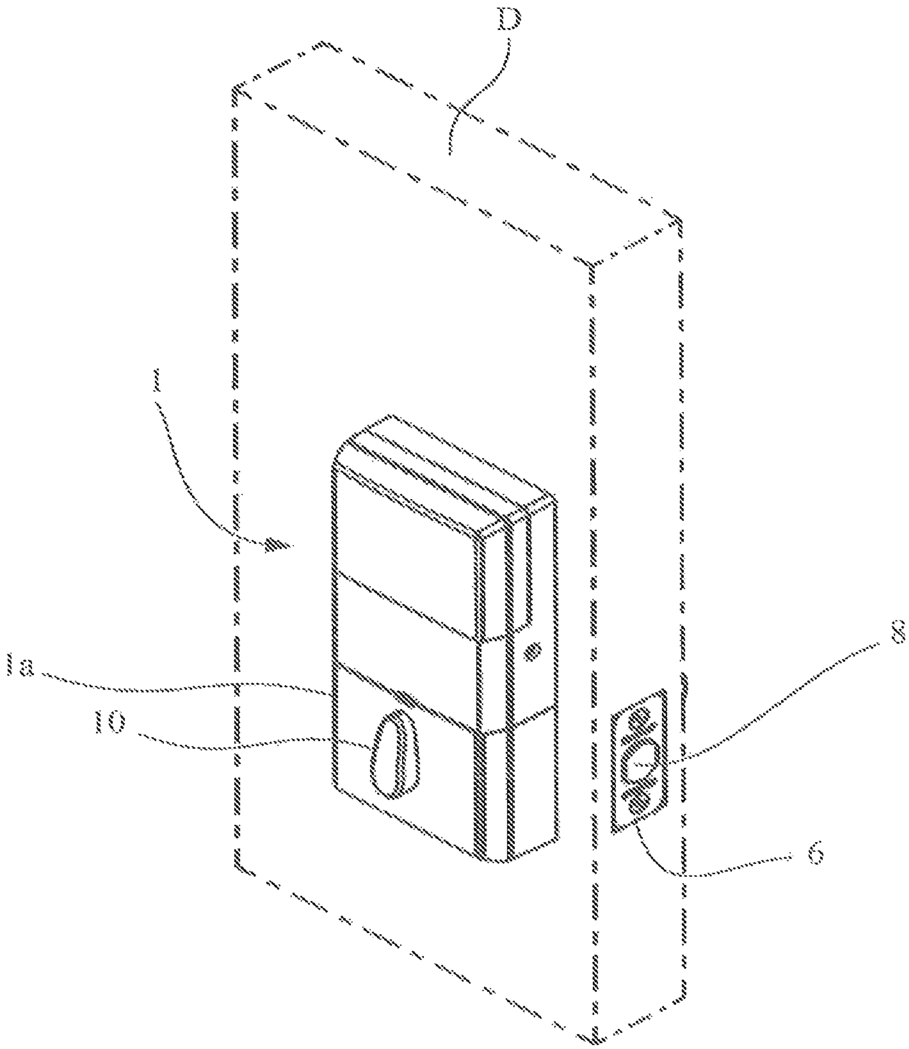
FIG. 1C is a perspective view of the electronic lock of FIG. 1A as viewed from the interior of the door.

Referring now to the drawings and particularly to FIGS. 1A-1C and 2, there is shown an electronic lock (EL) in accordance with the present invention for mounting on a door D, and which includes an interior chassis 1 having an interior escutcheon 1*a*, an exterior chassis 2 having an exterior escutcheon 2*a*, a mounting plate 3, an adapter 4, a latch assembly 5, and a strike 6.

Figure 2:
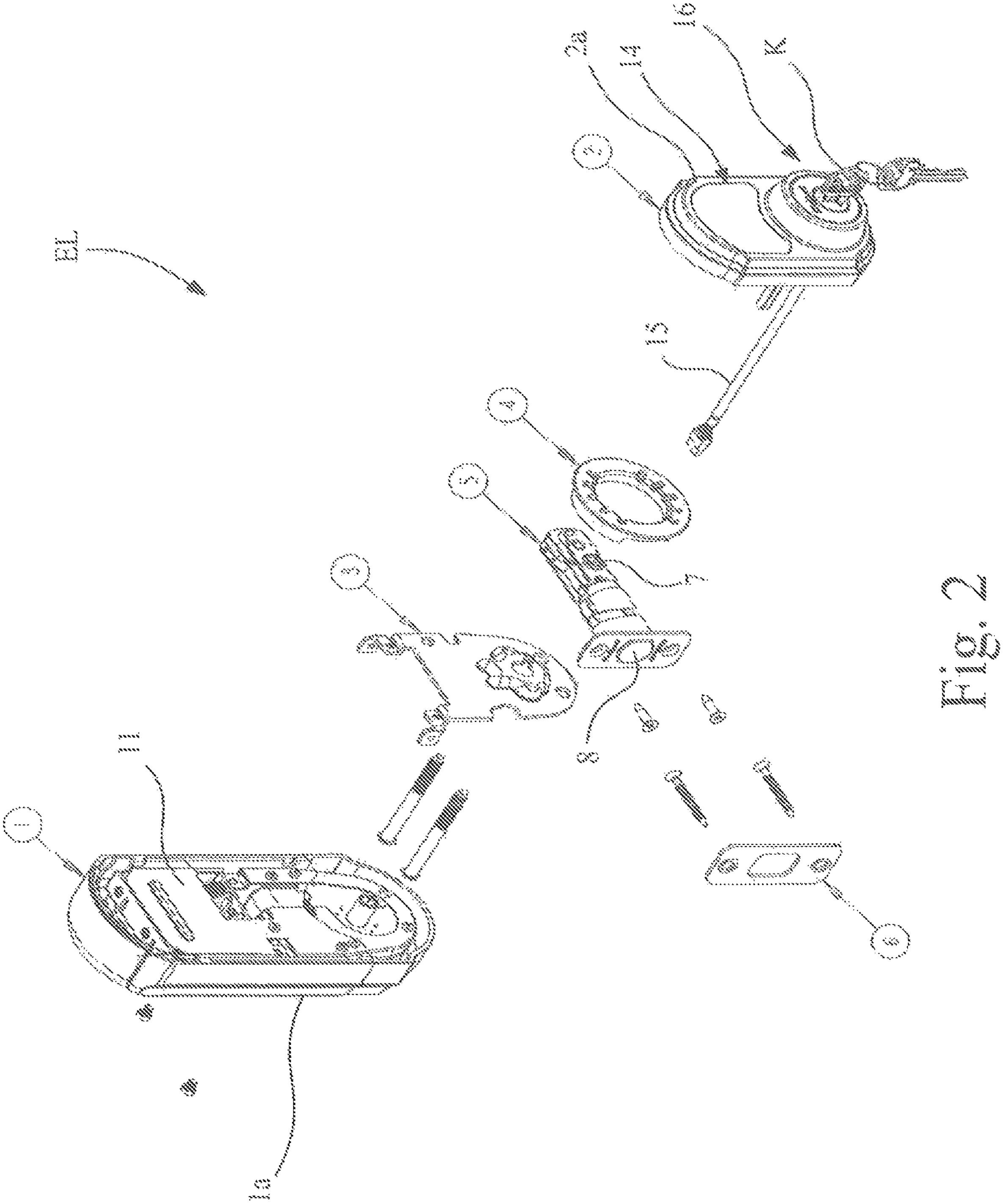
FIG. 2 is an exploded view of the electronic lock of FIGS. 1A-1C.

As shown in FIG. 2, latch assembly 5 is of a configuration well known in the art, and includes a bolt actuator mechanism 7, and a bolt 8. Mounting plate 3 is used to mount the electronic lock to the door D. Adapter 4 is used to adapt the electronic lock to a particular hole opening in the door D.

For manual operation of electronic lock (EL), a key actuator 16, having a removable key K, is provided to manually operate latch assembly 5 from the exterior of the door D.

Figure 3:
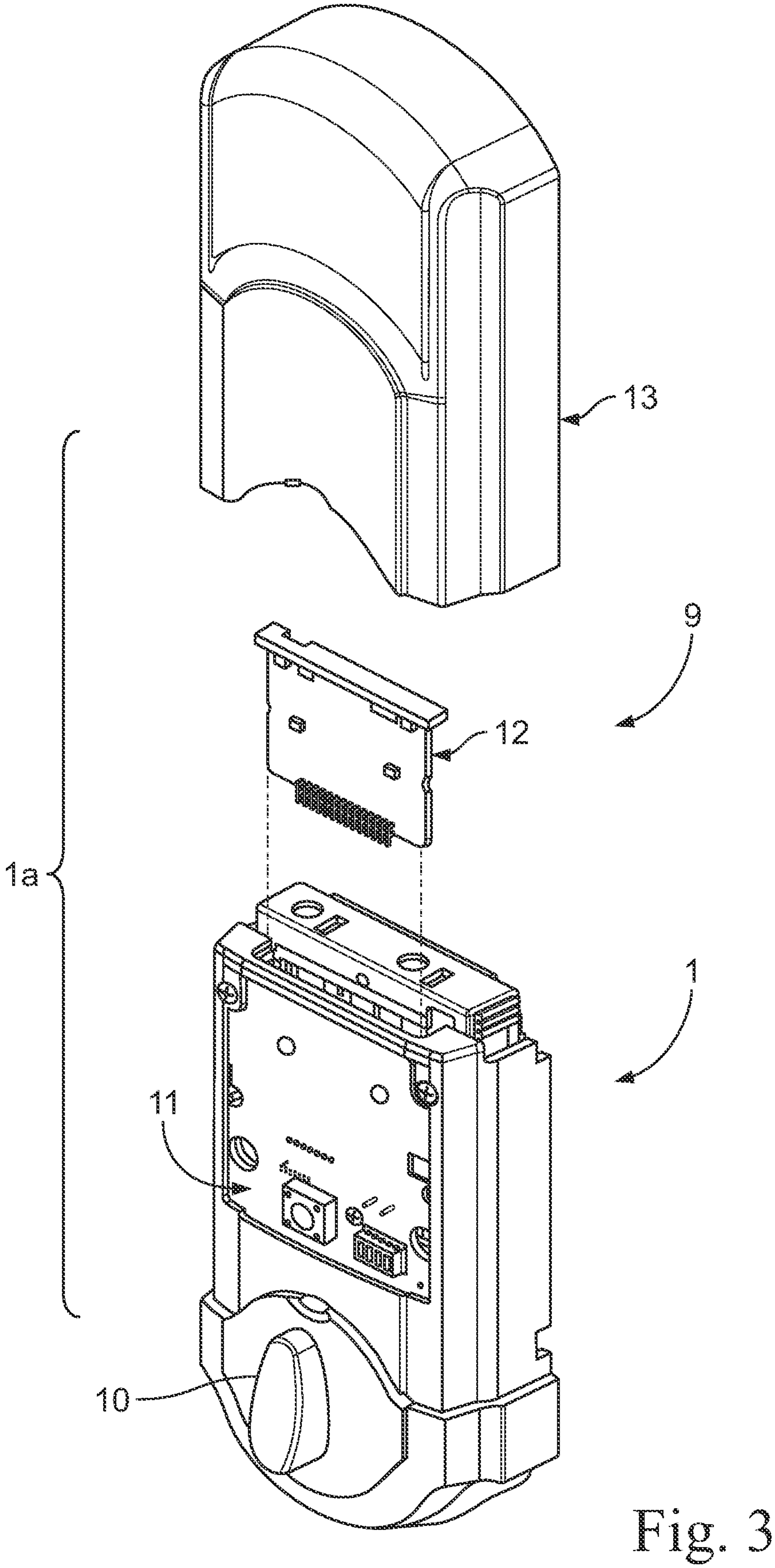
FIG. 3 is a perspective view of the interior chassis of the electronic lock of FIG. 2, with the upper cover and daughter card removed.

Referring also to FIG. 3, interior chassis 1 includes the electronic circuitry 9 for the electronic lock, and further includes a manual turnpiece 10. Manual turnpiece 10 is used on the interior side of door D to operate the bolt actuator mechanism 7 of latch assembly 5, and in turn to extend and retract bolt 8 (see also FIG. 1C). The electronic circuitry 9 includes a base board 11 and a removable daughter card 12. In FIG. 3, a removable cover 13 is provided to cover over the base board 11 and daughter card 12, when cover 13 is in the installed position.

Referring again to FIGS. 1A, 1B, 2 and 3, in accordance with an aspect of the present invention, exterior chassis 2 includes a contact sensor 14 that provides a contact region for user input, and is configured such that when the surface of contact sensor 14 comes in contact with a user, e.g., the user's hand, then a dormant communications portion of electronic circuitry 9 will be activated. Contact sensor 14 is electrically connected to the base board 11 of electronic circuitry 9, such as for example, by an electrical cable 15. Contact sensor 14 may be, for example, a capacitive sensor, an inductive sensor, or a pressure sensor, that generates a signal S when touched by a user, which in turn is sent to electronic circuitry 9. While contact sensor 14 is shown incorporated into exterior escutcheon 2*a*, it is contemplated that contact sensor 14 may be incorporated into other features near the lock area, such as on the lock face, or a dedicated contact pad could be provided. Also, it is contemplated that in some systems, it may be desirable to have an additional contact sensor that is accessible at the interior side of the door, e.g., at interior escutcheon 1*a*.

As an alternative embodiment, contact sensor 14 may be replaced with a proximity sensor, e.g., an infrared sensor, which detects the approach of a user and generates signal S without requiring the user to physically contact the sensor.

Referring particularly to FIG. 3, daughter card 12 of electronic circuitry 9 is a replaceable wireless communications module that facilitates wireless communications with an external device through a desired wireless communications protocol, e.g., Zigbee, Z-wave, etc. As such, electronic circuitry 9 may include, for example, an EMBER Corporation EM357 chip along with associated devices to handle all IEEE 802.15.4 operations. The chip and associated devices are driven by a 24.00 MHz crystal which is used to produce other internal clocks. Additional devices, such as LED's, switches, other integrated circuits, antenna, and others are designed into electronic circuitry 9.

Figure 4:
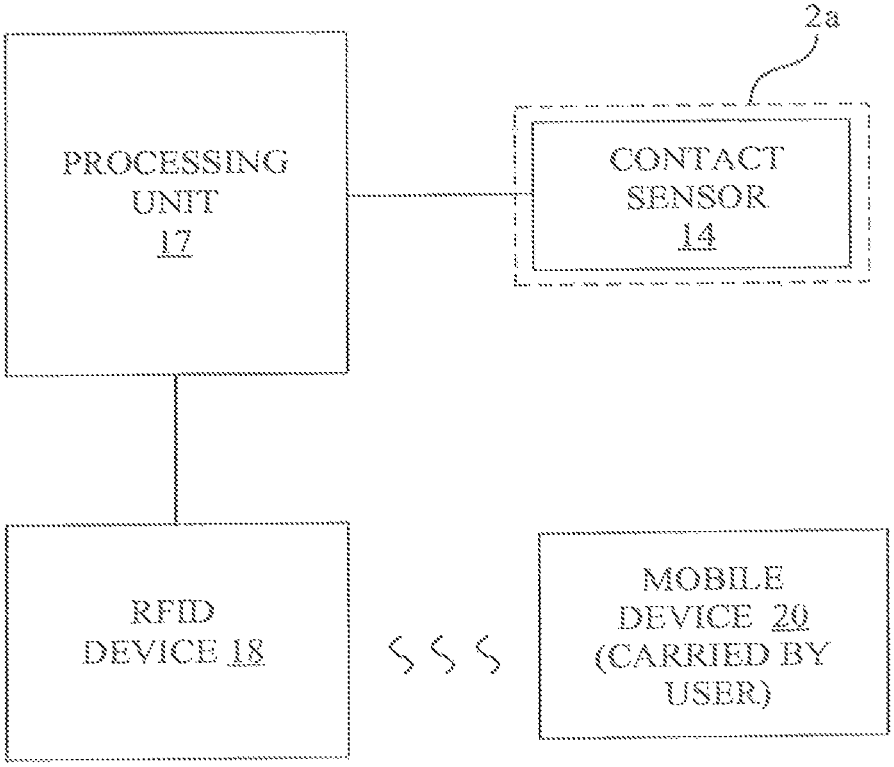
FIG. 4 is a block diagram of a portion of the electronics circuitry of the interior chassis of FIG. 3 in wireless communication with a mobile device, in accordance with an aspect of the present invention.

Referring to FIG. 4, electronic circuitry 9 also includes a processing unit 17 and a radio-frequency identification (RFID) device 18. Processing unit 17 includes a commercially available microprocessor or a custom built processing unit (ASIC=Application Specific Integrated Circuit) and associated input/output (I/O) circuitry, and is configured for electronic communication with contact sensor 14 and RFID device 18. Processing unit 17 may be communicatively coupled to contact sensor 14 and RFID device 18 via electrical wiring.

RFID device 18 may be a standard RFID reader device known in the art, having a maximum communication range of about 3 feet, e.g., the factory default. In an embodiment of the present invention, RFID device 18 includes an electrically powered RFID circuit reader, which may be incorporated, for example, into daughter card 12. RFID device 18 is configured to be selectively activated by an actuation of contact sensor 14, as further described below.

As a part of the system in some embodiments, there is also included a user carried mobile device 20 configured to communicate with RFID device 18 when RFID device 18 is activated. User carried mobile device 20 has an embedded RFID circuit that contains lock information, such as an access code, that operatively associates mobile device 20 with electronic lock (EL). In some embodiments, the lock information is preprogrammed into mobile device 20, and may be configured to correspond to a particular electronic lock, or to a set of electronic locks. Mobile device 20 may be, for example, a key fob. Alternatively, the key fob could be in the form of a RFID circuit attached to key.

As is typical in the art, the RFID circuit of mobile device 20 receives electrical power via electromagnetic induction from the reader circuit of RFID device 18 when the RFID circuit of mobile device 20 is within the communications range of RFID device 18. However, such communication is only possible when RFID device 18 is activated. RFID device 18 establishes electromagnetic induction through a RFID antenna that is embedded in exterior chassis 2 (see, e.g., FIG. 1A).

In an embodiment of the present invention, RFID device 18 is selectively activated for a predetermined period of time (e.g., 5 to 20 seconds) following the generation of the signal S by contact sensor 14. In operation, a user touches contact sensor 14 to generate signal S, which is then delivered to processing unit 17. Processing unit 17, upon receiving signal S, then activates RFID device 18 for communication. If RFID device 18 establishes communication with the mobile device 20, then RFID device 18 reads the RFID circuit of mobile device 20. Processing unit 17 then determines from the RFID information read from mobile device 20 whether mobile device 20 is authorized for use with electronic lock (EL).

If authorized, then processing unit 17 of electronic circuitry 9 responds by actuating the lock actuator mechanism, i.e., latch assembly 5, to unlock electronic lock (EL). The actuation of latch assembly 5 may be effected by energizing an electric motor (not shown) to retract the bolt 8 of latch assembly 5, thus permitting door D (see Fig. IB) to be opened from a closed position. After the predetermined period of time has expired, electronic lock (EL) will return to the locked state.

In an embodiment where a non-contact proximity sensor is used as a replacement for contact sensor 14, electronic circuitry 9 is configured to determine that mobile device 20 is on the exterior side of the door by enabling RFID device 18 to perform RF triangulation prior to having the lock actuator mechanism energized by processing unit 17 of electronic circuitry 9. In addition, triangulation may be used as a technique to program the distance range within which the user carrying mobile device 20 must be in order to activate the electronic lock (EL) to an unlocked state. For example, the user programmable range may be a distance of 1 foot to 6 feet.

In operation, when a valid proximity mobile device 20, i.e., a proximity key fob, using RFID communication is within a predetermined range of electronic lock (EL) and the user touches a contact sensor 14 of electronic lock (EL) with the user's hand, or alternatively the user is within range of the alternative lock proximity sensor, then electronic lock (EL) will be activated to an unlocked state. In other words, the valid proximity mobile device 20 may remain in the user's pocket, but when the user touches a designated portion of electronic lock (EL) (e.g., escutcheon, face plate, handle, etc.), or alternatively approaches electronic lock (EL), then electronic lock (EL) automatically goes to an unlocked state.

Advantageously, in embodiments of the present invention, there is no need to manipulate the lock mechanism with a key or keypad in order to unlock the lock.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A method for actuating an electronic lock with an exterior contact sensor and an interior contact sensor, the method comprising:

detecting a physical contact from a user at a first contact region of the exterior contact sensor or at a second contact region of the interior contact sensor;

in response to detecting the physical contact, generating an electrical signal at the exterior contact sensor or the interior contact sensor;

providing the electrical signal to a processing unit electrically coupled to the exterior contact sensor and the interior contact sensor, the processing unit being housed within an interior chassis of the electronic lock;

in response to receiving the electrical signal at the processing unit, activating, using the processing unit, a wireless communication device for a predetermined time period, the wireless communication device being housed within the interior chassis of the electronic lock;

during the predetermined time period, wirelessly reading, using the wireless communication device, an access code from a wireless communication circuit embedded in a mobile device carried by the user, the wireless communication circuit being in communication range of the wireless communication device using a wireless communication protocol;

determining, at the processing unit, whether the access code is valid; and in response to determining that the access code is valid, actuating, using the processing unit, a locking device of the electronic lock to move a locking bolt from a locked state to an unlocked state;

wherein the first contact region is exposed on an exterior chassis of the electronic lock; and wherein the second contact region is exposed on the interior chassis of the electronic lock.

2. The method of claim 1, further comprising, after the predetermined time period expires, automatically actuating, using the processing unit, the locking device of the electronic lock to move the locking bolt from the unlocked state to the locked state.

3. The method of claim 1, wherein the predetermined time period is between approximately 5 to 20 seconds.

4. The method of claim 1, wherein the exterior contact sensor is a capacitive sensor, an inductive sensor, or a pressure sensor.

5. The method of claim 1, wherein the mobile device is a key fob or a mobile phone.

6. The method of claim 1, wherein the wireless communication device is an RFID reader; and wherein the wireless communication circuit is an RFID circuit.

7. The method of claim 1, wherein the wireless communication protocol is a near-field communication protocol.

8. The method of claim 1, wherein the wireless communication protocol implements IEEE 802.15.4.

9. The method of claim 1, wherein determining whether the access code is valid comprises comparing the access code with a valid access code stored in a memory housed within the interior chassis of the electronic lock.

10. The method of claim 1, wherein wirelessly reading, using the wireless communication device, the access code from the wireless communication circuit embedded in the mobile device carried by the user comprises providing electrical power from the wireless communication device to the wireless communication circuit.

11. A method for actuating an electronic lock with a proximity sensor and an interior contact sensor, the method comprising:

detecting a user input at the proximity sensor or the interior contact sensor, wherein detecting the user input is performed by either: (1) using the proximity sensor, detecting an approach of a user to the electronic lock without a physical contact from the user; or (2) detecting a physical contact of the user with a contact region of the interior contact sensor, the contact region being exposed on an interior chassis of the electronic lock;

in response to detecting the user input, generating an electrical signal at the proximity sensor or the interior contact sensor;

providing the electrical signal to a processing unit electrically coupled to the proximity sensor and the interior contact sensor, the processing unit being housed within the interior chassis of the electronic lock;

in response to receiving the signal at the processing unit, activating, using the processing unit, a wireless communication device for a predetermined time period, the wireless communication device being housed within the interior chassis of the electronic lock;

during the predetermined time period, wirelessly reading, using the wireless communication device, an access code from a wireless communication circuit embedded in a mobile device carried by the user, the wireless communication circuit being in communication range of the wireless communication device using a wireless communication protocol;

determining, at the processing unit, whether the access code is valid; and in response to determining that the access code is valid, actuating, using the processing unit, a locking device of the electronic lock to move a locking bolt from a locked state to an unlocked state.

12. The method of claim 11, wherein the proximity sensor is an infrared sensor.

13. The method of claim 11, wherein the electronic lock is mounted to a door;

wherein the method further comprises determining that the mobile device is on an exterior side of the door; and wherein wirelessly reading, using the wireless communication device, the access code from the wireless communication circuit embedded in the mobile device carried by the user is performed after determining that the mobile device is on the exterior side of the door.

14. The method of claim 13, wherein determining that the mobile device is on the exterior side of the door comprises performing RF triangulation with the wireless communication device.

15. The method of claim 11, wherein the access code is preprogrammed into the wireless communication circuit.

16. The method of claim 11, wherein detecting the approach of the user to the electronic lock comprises detecting that the user is within a programmable range of the electronic lock.

17. The method of claim 16, wherein the programmable range is between 1 foot to 6 feet.

18. A method of actuating an electronic lock, the method comprising:

detecting a user input at the electronic lock, wherein detecting the user input at the electronic lock is performed by: (1) using a proximity sensor, detecting a presence of a user within a range of the electronic lock without contact on the proximity sensor; (2) detecting a physical contact of the user with a first contact region of an exterior contact sensor; or (3) detecting the physical contact of the user with a second contact region of an interior contact sensor;

in response to detecting the user input, generating a signal at the proximity sensor, the exterior contact sensor, or the interior contact sensor;

providing the signal to a processing unit of the electronic lock;

in response to receiving the signal, activating, using the processing unit, a wireless communication device of the electronic lock for a predetermined time period;

using the wireless communication device, powering a wireless communication circuit disposed within a mobile device carried by the user;

using the wireless communication device, reading lock information from the wireless communication circuit;

based on the lock information, determining that the mobile device is operatively associated with the electronic lock; and in response to determining that the mobile device is operatively associated with the electronic lock, actuating, using the processing unit, a locking device of the electronic lock to move a locking bolt from a locked state to an unlocked state;

wherein the first contact region is exposed on an exterior chassis of the electronic lock; and wherein the second contact region is exposed on an interior chassis of the electronic lock.

19. The method of claim 18, wherein the wireless communication device is an RFID reader; and wherein the mobile device is within 3 feet of the RFID reader.

20. The method of claim 18, wherein the wireless electronic circuit is attached to a key.

* * * * *